United States Patent
Berthet et al.

(10) Patent No.: US 8,267,256 B2
(45) Date of Patent: Sep. 18, 2012

(54) DEVICE FOR SORTING A HARVESTED STREAM OF FRUIT IN BUNCHES AND SEPARATION SYSTEM FURTHER INTEGRATING A DESTEMMING DEVICE

(75) Inventors: Jean-Paul Berthet, La Chaize-Giraud (FR); Christophe R. Defurne, La Chapelle-Hermier (FR); Christine Nakas, Le Poiré sur Vie (FR)

(73) Assignee: CNH America LLC, New Holland, PA (US)

( * ) Notice: Subject to any disclaimer, the term of this patent is extended or adjusted under 35 U.S.C. 154(b) by 206 days.

(21) Appl. No.: 12/452,975

(22) PCT Filed: Jul. 25, 2008

(86) PCT No.: PCT/EP2008/059822
§ 371 (c)(1),
(2), (4) Date: Apr. 27, 2010

(87) PCT Pub. No.: WO2009/016125
PCT Pub. Date: Feb. 5, 2009

(65) Prior Publication Data
US 2010/0275566 A1  Nov. 4, 2010

(30) Foreign Application Priority Data
Jul. 31, 2007 (FR) ..................... 07 05597

(51) Int. Cl.
*B07B 13/00* (2006.01)
(52) U.S. Cl. ........ 209/667; 209/671; 209/672; 460/134; 460/144
(58) Field of Classification Search .......... 460/132–134, 460/140, 142, 144; 209/667, 671, 672
See application file for complete search history.

(56) References Cited

U.S. PATENT DOCUMENTS

| | | | | | |
|---|---|---|---|---|---|
| 530,262 | A | * | 12/1894 | Distl | 209/667 |
| 2,743,813 | A | * | 5/1956 | Erickson | 209/668 |
| 2,973,093 | A | * | 2/1961 | Erickson | 209/667 |
| 3,028,957 | A | * | 4/1962 | Conway et al. | 209/672 |
| 3,396,843 | A | * | 8/1968 | Allen | 209/668 |
| 4,266,676 | A | * | 5/1981 | Ruckstuhl et al. | 209/672 |
| 5,060,806 | A | * | 10/1991 | Savage | 209/668 |
| 6,986,425 | B2 | * | 1/2006 | Paladin | 209/671 |

* cited by examiner

*Primary Examiner* — Alicia Torres
(74) *Attorney, Agent, or Firm* — Michael G. Harms

(57) ABSTRACT

A device (1) for sorting a harvested stream of fruit in bunches is mounted in a harvesting machine. The sorting device includes at least two transverse sorter bars (3) driven with a cyclic relative movement, the cyclic relative movement enabling longitudinal displacement of the stream over the bars, while opening passages (4) between them. The passages allow detached berries to drop under the sorting device.

13 Claims, 3 Drawing Sheets

DEVICE FOR SORTING A HARVESTED STREAM OF FRUIT IN BUNCHES AND SEPARATION SYSTEM FURTHER INTEGRATING A DESTEMMING DEVICE

The invention relates to a device for sorting a harvested stream of fruit in bunches, a separation system including such a sorting device, and a harvesting machine including such a separation system and possibly such a sorting device.

The invention applies to the field of mechanised harvesting of fruit growing on trees or bushes, such as grapes or other fruit growing in bunches.

The fruit is conventionally harvested by a shaker system that straddles a row of plants to detach the harvest. The harvested stream obtained is then conveyed into the machine to be stored in at least one hopper provided for this purpose or in an attached trailer.

However, because of the action of the shaker system, the harvested stream includes, in addition to detached fruit, and among other things, juice, leaves, wood particles, bunches of fruit of various sizes.

To eliminate components other than fruit, in particular leaves and wood particles, harvesting machines include a cleaning system which is adapted to eliminate said components from the stream by suction before storage.

Moreover, the search for quality in vinification requires destemming of the cleaned grape stream to separate the fruit from components attached to the fruit, such as stalks, and thus to store only the separated fruit. It is furthermore possible to perform sorting before destemming in order to destem only the remaining portion including the bunches.

The document EP-1 002 467 discloses a machine for picking off grapes before vinification. To this end, this document teaches driving in rotation an endless apron or belt forming a screen and, above said apron, a so-called "porcupine" or rake with a relative movement for separating grapes from stalks with an ejection effect.

This machine has the particular drawback of its large overall size, because of the space needed to accommodate the return run of the apron and the means for rotating said apron. Furthermore, the apron is made from synthetic material and driving it in rotation causes it to wear.

Moreover, separated grapes passing through the apron drop onto the return run of said apron and must therefore pass through said return run to be received into the storage hopper. As a result of this, mechanical forces are applied to the grapes for no useful reason after they have been picked off.

Furthermore, if the action of the rake causes components detached from the grapes, in particular stalks, to pass through the apron, they remain stuck on the upper surface of the return run, which carries them to the driving roller of the apron. It is therefore desirable to provide means for eliminating the stalks when they reach this roller, for example an endless screw. Failing this, there is a risk of the machine becoming soiled in the region of the roller and a large quantity of stalks could end up in the berry storage hopper below said roller.

The prior art machine in question also has the drawback that there is no provision for modification to suit the size of the berries to be separated. The openings of the apron are of fixed size, whereas the size of the berries can vary as a function of the crop type.

Moreover, the upper surface of the apron is liable to be soiled by components other than berries and/or by components detached from the berries. In an attempt to solve this problem, a rubbing member is conventionally provided to clean the surface of the apron, which further increases the size of the machine and the risk of wear. Moreover, to limit soiling, the stream from which berries are to be picked off must first be thoroughly cleaned, which increases the risk of sucking up berries and/or juice.

The invention aims to improve on the prior art by proposing in particular a separation system integrating a sorting device and a destemming device, said system being small, of variable size and resistant to soiling.

To this end, a first aspect of the invention proposes a device for sorting a harvested stream of fruit in bunches, said device being intended to be mounted in a harvesting machine, said sorting device including at least two transverse sorter bars driven with a cyclic relative movement, said sorter bars and said movement being adapted to enable longitudinal displacement of the stream over said bars and to continuously increase and decrease passages between them, allowing movement of detached berries through said passages to drop under said sorting device when said passages are increased, and precluding movement of the detached berries through said passages when said passages are decreased.

A second aspect of the invention proposes a system for separating berries from a harvested stream of fruit in bunches, said system being intended to be mounted in a harvesting machine, said system including a conveyor of the stream in a longitudinal direction, said conveyor comprising at least one such sorting device and, downstream of said sorting device, at least one destemming device, said destemming device including at least one screen the apertures whereof are adapted to allow the berries to pass through, said screen being surmounted by a motorised rotary member including paddles which are adapted, when they rotate, to interact with the stream coming from the sorting device to cause the separation of berries attached to the bunches.

A third aspect of the invention proposes a machine for harvesting fruit in bunches including a motorised support structure and a harvesting system mounted on said structure, said harvesting system being adapted to detach the harvest, said machine including the above separation system, which is supplied with a harvested stream coming from the harvesting system.

Other objects and advantages of the invention will become apparent in the course of the following description, which is given with reference to the appended figures, in which.

The invention concerns a machine for harvesting fruit in bunches, in particular a harvester for mechanised harvesting of grapes, notably for subsequent vinification thereof. A grape harvester conventionally includes a motorised support structure that is equipped with a driver station and a harvesting system mounted on said structure.

The grape harvester is designed to straddle at least one row of vines in order, as it moves, to receive the vine stems successively into the harvesting system, which is adapted to detach the fruit. To this end, the harvesting system includes vine shakers, in particular a series of shaker rods provided on either side of the space into which the vine stems are introduced.

The grape harvester also includes a system for continuous recovery of the detached crop, which includes, in addition to detached grapes, and among other things, juice, leaves, wood particles, bunches of various sizes. In one embodiment, the system includes two bucket conveyors adapted to recover the detached crop under the shakers and to convey said crop into the upper portion of the harvester.

In the context of grape vinification, it is desirable to debunch or destem the harvested grapes to eliminate stalks and to store only grapes and juice.

A separation system mounted on the machine and supplied with a stream of crop material coming from the harvesting system is described hereinafter with reference to FIG. 1.

The separation system includes a conveyor that conveys the stream in a longitudinal direction, said conveyor comprising at least one sorting device 1 and, downstream of said sorting device, at least one destemming device 2. The separation system is adapted to sort the harvested stream into two layers as a function of the size of the components of said stream and to destem the layer containing the bunches.

Figure 1:
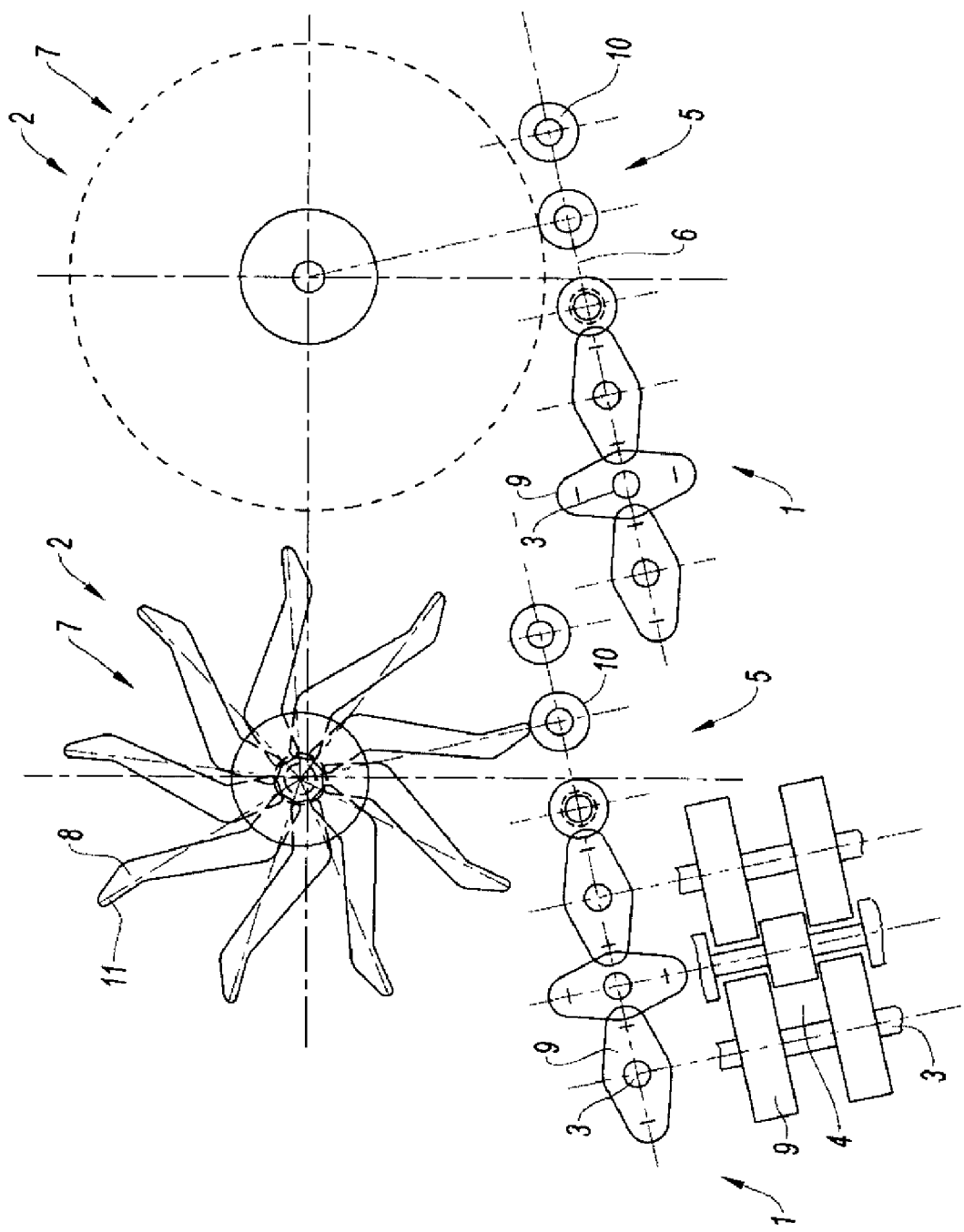
FIG. 1 is a diagrammatic representation in longitudinal section of the conveyor of one embodiment of a separation system of the invention, FIG. 1 also including a section showing a partial top view of the sorter bars.

FIG. 1 shows a conveyor comprising two sets including a sorting device 1 and a destemming device 2, said conveyor therefore including an alternating succession in the longitudinal direction of sorting devices 1 and destemming devices 2.

Thus the invention teaches, before destemming, carrying out a sorting operation in order to destem only the portion containing the bunches; successive sorting and destemming are integrated into the same system and can be carried out more than once to enhance the yield in terms of detached berries.

The sorting device 1 and the destemming device 2 each define a conveyor plane arranged to transport the harvested stream from an upstream end toward a downstream end of the separation system. Thus it is possible to determine the number and/or size of the sorting devices 1 and the destemming devices 2 comprised by the conveyor so that the stream has been totally destemmed at the downstream end.

Furthermore, in FIG. 1, the conveyor planes of the sorting device 1 and the destemming device 2 of a set are substantially aligned, and the conveyor plane of a destemming device 2 of one set is offset upward relative to the conveyor plane of the sorting device 1 of the other set, which is adjacent to it in the downstream direction. Thus the stream transported on the conveyor passes over one set and then drops onto the next set.

The sorting device 1 includes at least two transverse sorter bars 3 driven with a cyclic relative movement, said movement being adapted to allow longitudinal movement of the stream over said bars and opening of passages 4 between them. Furthermore, the passages 4 are adapted to allow detached berries to drop under said sorting device. Accordingly, detached berries can be recovered by providing a berry recovery hopper under the conveyor.

Thereafter, the portion retained on the sorter bars 3, which includes bunches of fruit, is fed to the destemming device 2. To effect destemming, i.e. to separate berries attached to stalks in the harvested stream, the destemming device includes at least one screen 5 the openings 6 whereof are adapted to allow the detached berries to pass through them. The screen 5 is surmounted by a motorised rotary member 7 ("porcupine") including paddles 8 which are adapted, on rotation of the rotary member, to interact with the stream coming from the sorting device 1 in order to separate berries attached to bunches. Thus detached berries pass through the screen 5 and are recovered in the hopper under the conveyor.

In the embodiment described, the sorting device 1 includes three sorter bars 3 that are conjointly driven to rotate about their transverse axes. The bars 3 carry members 9 the outside envelope of which is not circular around their rotation axis. Moreover, the members 9 of two adjacent sorter bars 3 are disposed to cooperate to move the stream longitudinally on said bars and open passages 4 between them.

In particular, the members 9 of a sorter bar 3 are offset angularly and transversely relative to the members 9 of the adjacent bar 3 to form passages 4 longitudinally between a member 9 and the adjacent bar 3 and/or transversely between two adjacent members 9 of a respective bar 3.

In the Figures, the geometry of the envelope of the members 9 is inscribed within an ellipse to have one radial dimension that is greater than a perpendicular radial dimension. Moreover, the members 9 of two adjacent bars 3 are offset angularly by 90° and transversely by a step greater than the transverse dimension of the members 9. Thus the configuration represented in the lower left section in FIG. 1 is obtained by providing a distance between the centres of the bars 3 that is greater than half the greater radial dimension of the members 9. Moreover, in this configuration, the two exterior sorter bars 3 are disposed identically and transversely.

The sorting device 1 obtained in this way is particularly efficient because of a high level of agitating of the harvested stream to be sorted. As they rotate, the geometry of the members 9 induces a succession of accelerations in various directions.

In one embodiment, the destemming device 2 includes a screen 5 that comprises at least two transverse destemmer bars 10 the distance between centres of which is defined to form openings 6 between them. In FIG. 1, the screen 5 comprises three destemmer bars 10 that are free to rotate about their axis. In this embodiment, the screen 5 is fixed against movement in longitudinal translation relative to the rotary member 7, eliminating the need for means for moving said screen in translation.

The separation system can include a frame on which are mounted the sorter bars 3, the destemmer bars 10 and the rotary member 7, said frame enabling the system to be mounted in the machine. In particular, the frame can be mounted so that the longitudinal conveyor direction is inclined upward relative to the horizontal, to obtain the benefit of gravity for enhanced separation along said conveyor.

In the embodiment shown, the destemmer bars 10 have an exterior envelope of circular section about their rotation axis so that openings 6 are formed between said bars. Moreover, the rotary member 7 is disposed over said bars so that as they rotate the ends of the paddles 8 become tangential to said bars. Thus berries and stalks are separated with an ejection effect. Moreover, in FIG. 1, each paddle 8 comprises transversely aligned fingers 11 having one end defining an angle of attack on the berries that it is oriented forwardly to encourage such ejection.

As they come into contact with the stream, the fingers 11 and the bars 3, are preferably made from a corrosion-resistant material, such as a stainless metal for the bars 3, 10 and a synthetic material for the fingers 11.

In FIG. 1, the distance between centres is exactly the same for all the bars 3, 10 of a set. However, the distance between the centres of the destemmer bars 10 can be adjustable to modify the geometry of the openings 6 as a function of the size of the berries to be destemmed.

Furthermore, the distance between the centres of the sorter bars 3 and/or their respective transverse positions can be adjustable in order to modify the geometry of the passages 4. In particular, the geometry of the passages 4 of the sorting devices 1 and/or the geometry of the openings 6 of the destemming device 2 can be different as a function of the characteristics of the stream to be separated and as a function of the longitudinal position of said device on the conveyor.

Figure 2:
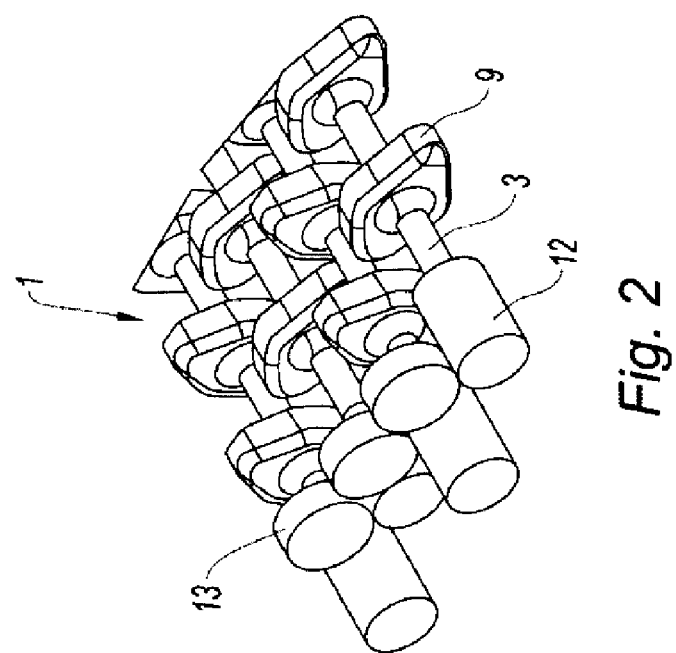
FIG. 2 shows partly and in perspective the sorter bars of one embodiment of a sorting device according to the invention.

Modulation of the distance between centres and the transverse position of four sorter bars 3 the ends of which are provided with a gear 12, is described with reference to FIGS. 2 to 4, two adjacent gears 12 meshing in rotation via a common drive gear 13.

Figures 3A, 3B, 3C:
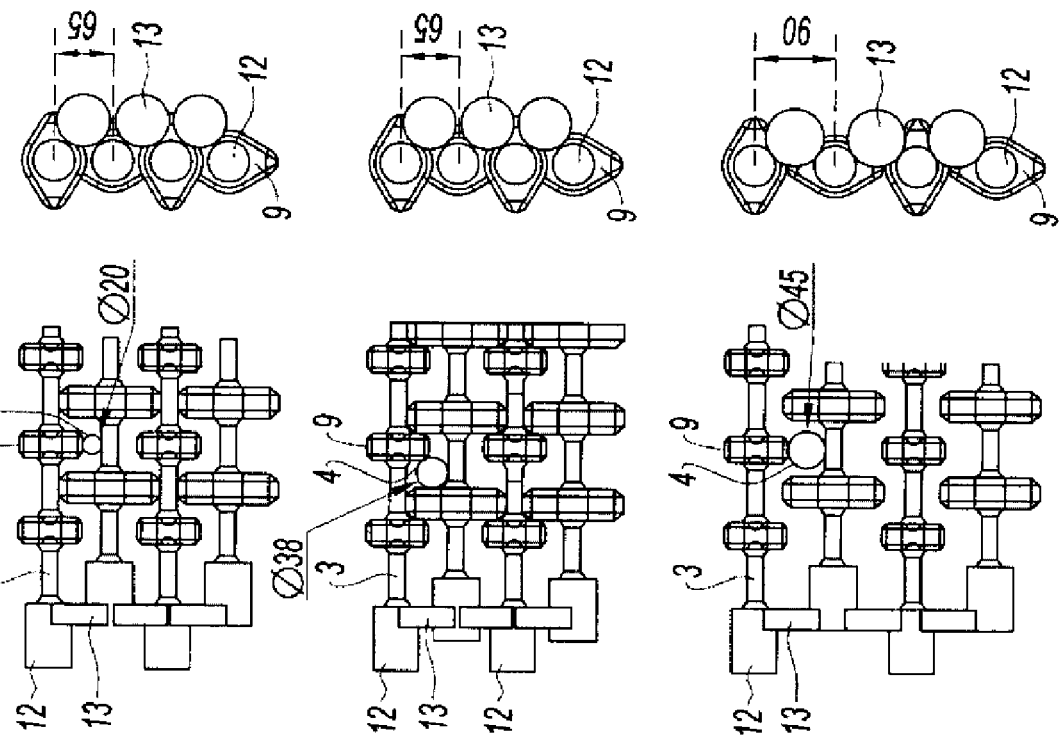
FIG. 3 shows the sorter bars from FIG. 2 from above and from the side driven in rotation, respectively in a position with a nominal distance between centres (FIG. 3a), a position with transversely offset centres (FIG. 3b), and a position with increased distance between centres (FIG. 3c)
Figure 4A:
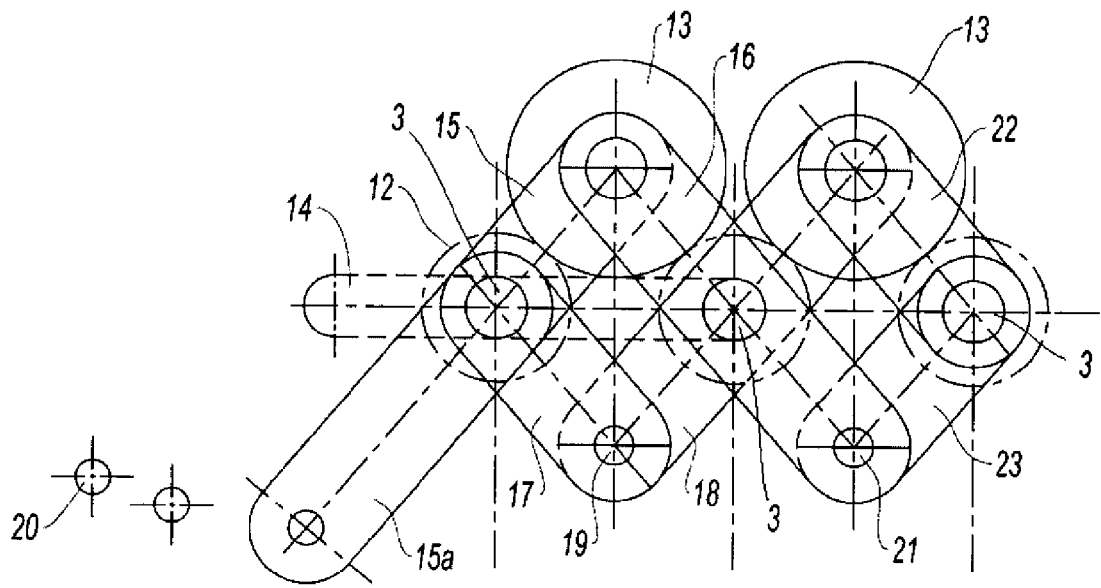
FIG. 4 shows one embodiment of the means for adjusting the distance between centres of the sorter bars from FIG. 2 including a double deformable parallelogram, respectively in a nominal distance between centres position (FIG. 4a) and an increased distance between centres position (FIG. 4b).
Figure 4B:
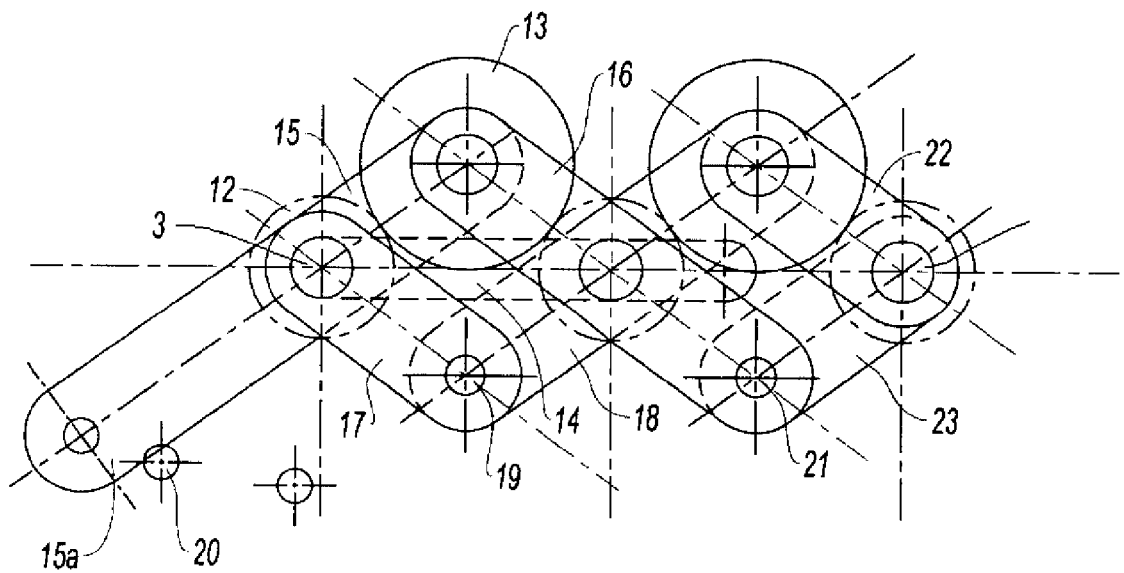

In FIG. 3a, the arrangement is similar to that represented in the lower left section in FIG. 1, i.e. with a nominal distance between centres of 65 mm and a member 9 positioned in the middle of the space left free between two successive members 9 of the adjacent bar 3. In this configuration, the passages 4 are formed longitudinally between a member 9 and the adjacent bar 3 and have a diameter of 20 mm.

In FIG. 3b, alternate sorter bars 3 are offset transversely to offset the member 9 in the available space between two successive members 9 of the adjacent bar 3. To enable meshing in this offset position, the gears 12 have a transverse dimension sufficient to maintain contact with the drive gear 13. In this configuration, passages 4 are formed longitudinally and transversely between two adjacent members 9 of a respective bar 3 and have a diameter of 38 mm.

In FIG. 3c, the distance between the centres of the sorter bars 3 is increased to 90 mm to form longitudinal passages 4 of 45 mm diameter. Of course, this configuration can be combined with transverse displacement of the sorter bars 3.

One embodiment of the means for adjusting the distance between the centres of the sorter bars 3 and the meshing in rotation of said bars over a range of values of the distance between centres is described with reference to FIG. 4.

In this embodiment, the means for adjusting the distance between centres include a longitudinal slot 14 in which the ends of two bars 3 are mounted for translational movement and two links 15, 16 respectively connecting the bar ends to the drive gear 13 driving them in rotation.

Furthermore, two other links 17, 18 are provided for respectively connecting the end of the bars 3 to a pivot 19, to constitute a deformable parallelogram between the links 15-18. Thus on deformation of the parallelogram the distance between the ends of the bars 3 varies to adjust the distance between centres while the distance between the gears 12 on said ends and the drive gear 13 remains constant to keep the gears in mesh.

Moreover, the exterior link 15 has a projecting portion 15a forming an operating lever for adjusting the distance between centres by deforming the parallelogram, the positions of the lever being definable by the positions of holes 20 into which the lever can be fixed, for example screwed.

A third sorter bar 3 is provided adjacent to the interior sorter bar 3, said third bar being fixed against longitudinal movement and driven in rotation by second drive means in the form of a gear 13 that is shared with the interior bar 3. The means for adjusting the distance between the centres of said bars then include a double deformable parallelogram (pantograph) between the ends of the bars 3, the drive means 13 and two retaining pivots 19, 21.

To this end, the link 16 connects the drive gear to the pivot 21 via the end of the interior bar 3 and the link 18 connects the other drive gear 13 to the pivot 19 via the end of the interior bar 3. Moreover, two links 22, 23 connect the end of the third sorter bar 3 to this other drive gear 13 and the pivot 21, respectively.

One embodiment of the harvesting machine further includes a device 1 for sorting the stream into a sorted portion containing detached berries and a remaining portion containing bunches, the separation system described above being fed with the remaining portion containing bunches.

In particular, the sorting device 1 may be similar to that integrated into the separation device, the passages 4 of said device being such that the sorted portion drops under said device. In this embodiment, the sorting device 1 can include a greater number of sorter bars 3 to separate the harvested stream into two layers as a function of the size of the components of said stream.

It is therefore possible to realise sorting before destemming, in particular when cleaning the harvested stream. In this case, the sorting device 1 receives the crop stream coming from the bucket conveyor and can be equipped with aspiration means to eliminate components other than fruit, in particular leaves and wood particles. The aspiration means are then disposed over the remaining crop portion and therefore at a distance from the sorted portion that has passed through, for example onto a conveyor, said suction means being in particular adjusted to suck up leaves and wood particles but not bunches.

The invention claimed is:

1. A system for separating berries from a harvested stream of fruit in bunches, said system being intended to be mounted in a harvesting machine, said system comprising a means for conveying the stream in a longitudinal direction, said conveying means including at least one sorting device (1), wherein the sorting device includes at least two transverse sorter bars (3) driven with a cyclic relative movement, said sorter bars and said movement being adapted to enable longitudinal displacement of the stream over said bars and to continuously increase and decrease passages (4) between them, allowing movement of detached berries through said passages to drop under said sorting device when said passages are increased, and precluding movement of the detached berries through said passages when said passages are decreased and, downstream of said sorting device, at least one destemming device (1), said destemming device including at least one screen (5) the apertures (6) whereof are adapted to allow the berries to pass through, said screen being surmounted by a motorised rotary member (7) including paddles (8) which are adapted, when they rotate, to interact with the stream coming from the sorting device (1) to cause the separation of berries attached to the bunches.

2. A separating system according to claim 1, wherein the screen (5) is fixed against movement in longitudinal translation relative to the rotary member (7).

3. A separating system according to claim 1 further including a frame on which the sorter bars (3), the screen (5) and the rotary member (7) are mounted.

4. A separating system according to claim 1, wherein the screen (5) comprises at least two transverse destemmer bars (10) which are spaced to form openings (6) between them.

5. A separating system according to claim 4, wherein the destemmer bars (10) are free to rotate about their axis.

6. A separating system according to claim 4, wherein the destemmer bars (10) have a circular exterior envelope.

7. A separating system according to claim 4, wherein the distance between the centres of the destemmer bars (10) is adjustable in order to modify the geometry of the openings (6).

8. A separating system according to claim 1, wherein the rotary member (7) is disposed above the screen (5) so that as they rotate the ends of the paddies (8) become tangential to said screen.

9. A separating system according to claim 1, wherein the conveyor includes an alternating succession in the longitudinal direction of sorting devices (1) and destemming devices (2).

10. A separating system according to claim 9, wherein the geometry of the passages (4) of the sorting devices (1) and/or the geometry of the openings (6) of the destemming devices (2) are variable as a function of the longitudinal position of said device on the conveyor.

11. A separating system according to claim 9, wherein the conveyor plane of a destemming device (2) is offset upward relative to the conveyor plane of the sorting device (1) that is adjacent to it in the downstream direction.

12. A machine for harvesting fruit in bunches comprising a motorised support structure and a harvesting system mounted on said structure, said harvesting system being adapted to detach crop, said machine including a separation system for supplying thereto a crop stream coming from the harvesting system, wherein the separation system includes a means for conveying the stream in a longitudinal direction, said conveying means comprising at least one sorting device (1) according to any of the claims 1 to 8 and, downstream of said sorting device, at least one destemming device (1), said destemming device including at least one screen (5) the apertures (6) whereof are adapted to allow the berries to pass through, said screen being surmounted by a motorised rotary member (7) including paddles (8) which are adapted, when they rotate, to interact with the stream coming from the sorting device (1) to cause the separation of berries attached to the bunches.

13. A harvesting machine according to claim 12, further comprises a device (1) for sorting the stream into a sorted portion containing detached berries and a remaining portion containing bunches, the separation system being fed with the remaining portion containing bunches.

* * * * *